Patented May 12, 1931

1,804,740

UNITED STATES PATENT OFFICE

EDWARD J. BUCZKOWSKI, OF AMBLER, PENNSYLVANIA, ASSIGNOR TO AMBLER ASBESTOS SHINGLE & SHEATHING COMPANY, OF AMBLER, PENNSYLVANIA, A CORPORATION OF PENNSYLVANIA

WATERPROOF AND DIELECTRIC ASBESTOS LUMBER

No Drawing.      Application filed February 5, 1930. Serial No. 426,193.

My invention relates to and has for its general object the production of slabs, boards or sheets composed essentially of inert fibrous material, such as asbestos, and binder, such as Portland cement, and an asphaltic or like compound, the product having waterproof and dielectric properties.

It has heretofore been proposed to provide boards or slabs of asbestos fiber and cement and an insulating material which is introduced by impregnation after the slab of asbestos and cement has first been formed and hardened. In producing a board of this character the slab of cement and asbestos fiber is permitted to set and age for some ten days or longer, being sprinkled with water at intervals to promote regularity in the setting and hardening process, after which the slab material is ground off or surfaced and is subsequently impregnated with the insulating compound which is in the form of a hot liquid, such as a mixture of asphalt and wax tailings, applied under a pressure of some eighty or ninety pounds. The time of the impregnation varies with the thickness of the slab, a thin one-half inch slab requiring six hours or so of impregnation, while a slab three times as thick requires about ninety six hours.

The chief object of the present invention is to produce slabs or boards of similar character by a process which does away with the impregnating step of the prior process, the asphaltic compound being introduced in liquid form of normal temperature into the slurry of asbestos, cement and water during the process of formation of the slab or board. To obtain the desired results the asphalt should be emulsified prior to its introduction into the slurry material or wet plastic.

The percentages of asbestos fiber and hydraulic binder to be employed may vary within certain limits, this being true also of the emulsified asphaltic compound. I have found that an advantageous proportion of materials is 25 per cent binder, 59 per cent asbestos fiber and 16 per cent emulsified asphalt, to which may be added approximately 60 per cent of water, although other percentages of water may be satisfactorily used.

The emulsified asphalt preferably used is an asphalt, pitch or the like which has been so treated that it may be caused to remain in suspension in water or other liquid. The treatment may involve a mechanical division or break-up of the asphalt, together with the addition of clay to prevent "tackiness", the asphalt being ground with the clay which is introduced in pulverized form and the quantity of clay varying for different conditions. It may for example be 40 per cent of the emulsified asphalt. The emulsified asphalt at normal or ordinary temperature is preferably introduced into the previously prepared slurry of asbestos and cement material and prior to introduction into the mold die or other sheet or slab forming apparatus.

In forming the board or slab of the compound or mixture of fiber binder, emulsified asphalt and water, a pressure die arrangement may be employed of the character disclosed in my pending application Serial No. 372,321 filed June 20, 1929. Pressure is retained upon the sheet ordinarily for such time as it required to remove excess water within the pressure limit; that is to say, as soon as water ceases to leave the material after it has reached the desired pressure, the pressure is released and the sheet is removed from the die press, after which it is suitably hardened and cured.

Ordinarily a pressure of approximately 1500 pounds per square inch is used, although here again considerable variation is possible, particularly in increased pressures; although a slight decrease in pressure is preferable for the heavier or thicker slabs. I have found a desirable pressure range to be 1500 pounds per square inch for all thicknesses of slabs up to one inch; 1200 pounds per square inch for thicknesses between one inch and two and one-half inches; and 1000 pounds per square inch for slabs thicker than two and one-half inches.

The setting of the material is not accomplished until after it has been removed from the press in slab or sheet form. The asphalt has a slight effect upon the setting of the hydraulic cement, but resulting decrease in strength is not serious.

The sheet material containing emulsified asphalt may also be produced in the form of sheathing or thin sheets by the so-called Hatcheck process, in which case the percentages of the ingredients is the same except that the percentage of water is greatly increased; i. e. to approximately 95 per cent. No material change in the Hatcheck process or apparatus is necessary, the emulsified asphalt being merely added to the ingredients prior to the beginning of the process.

The resulting product made in accordance with the invention may be ground off or treated to provide a suitable surface, and may be subsequently finished with lacquer or other desired finishing material.

The introduction of emulsified asphalt as one of the elements of the product is found to increase its water resisting property as well as its dielectrical resistance. The introduction of the asphalt in liquid form during formation of the product or slab has the advantage of evenly and uniformly distributing it through the slab, however thick it may be.

In color it may vary from light to dark brown to black. Its resistance to high temperature is great; it will withstand a temperature above 250 degrees centigrade. Also, the application of flame to the product will not materially affect it as it will not burn even when the flame is in direct contact with it.

It will be apparent that the process is considerably simplified over the prior process, the finished product being completed when the formation of the board or slab is completed, the former pre-heating of the dielectric ingredient and additional impregnating treatment with it being elminated. As a result, a water proof and dielectric slab of asbestos and cement material that is satisfactory for many purposes may be produced at comparatively low cost.

I claim:

1. A waterproof and insulating slab composed of asbestos fiber material hydraulic cement and asphalt, the asphalt being introduced prior to the formation of the slab.

2. A waterproof and insulating sheet or slab composed of asbetos fiber material in the proportion of approximately 50 per cent, hydraulic cement in the proportion of 25 per cent and asphalt in the proportion of 16 per cent.

3. A waterproof and insulating slab composed of asbestos fiber material, hydraulic cement and emulsified asphalt, the emulsified asphalt being introduced at normal temperature prior to the formation of the slab.

4. A waterproof and insulating slab composed of asbestos fiber material in the proportion of approximately 50 per cent, hydraulic cement in the proportion of 25 per cent, and emulsified asphalt in the proportion of 16 per cent, the emulsified asphalt being introduced at normal temperature prior to the formation of the slab.

5. The method of producing a waterproof dielectric slab composed of inert fibrous material, hydraulic cement, asphaltic material and water, which consists in preparing a slurry mixture of the asbestos material, cement and water, together with asphaltic material which has been previously emulsified and in emulsified condition is added to the mixture after or with the water, subsequently compressing the mixture in suitable form to produce a slab and finally drying and curing the slab.

EDWARD J. BUCZKOWSKI.